(12) United States Patent
Carter, Jr.

(10) Patent No.: US 6,474,598 B2
(45) Date of Patent: Nov. 5, 2002

(54) LANDING GEAR SHOCK ABSORBER WITH VARIABLE VISCOSITY FLUID

(75) Inventor: Jay W. Carter, Jr., Burkburnett, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 0 days.

(21) Appl. No.: 09/863,658

(22) Filed: May 23, 2001

(65) Prior Publication Data

US 2001/0048049 A1 Dec. 6, 2001

Related U.S. Application Data

(60) Provisional application No. 60/206,669, filed on May 24, 2000.

(51) Int. Cl.$^7$ .............................................. B64C 25/58
(52) U.S. Cl. .............................. 244/104 FP; 188/267.1
(58) Field of Search ....................... 244/104 FP, 104 R, 244/100 R; 267/64.15; 188/267.2, 267.1, 267, 317, 182

(56) References Cited

U.S. PATENT DOCUMENTS

| | | | | |
|---|---|---|---|---|
| 2,846,028 A | * | 8/1958 | Gunther .................... | 188/267.2 |
| 3,888,436 A | * | 6/1975 | Sealey ......................... | 188/284 |
| 4,493,659 A | * | 1/1985 | Iwashita ................... | 188/299.1 |
| 4,506,869 A | * | 3/1985 | Masclet et al. .......... | 188/266.2 |
| 5,161,653 A | | 11/1992 | Hare, Sr. .................... | 177/267 |
| 5,632,361 A | | 5/1997 | Wulff et al. ................ | 188/267 |
| 5,853,145 A | | 12/1998 | Carter, Jr. ................. | 244/17.25 |
| 5,865,399 A | | 2/1999 | Carter, Jr. ..................... | 244/54 |
| 5,944,283 A | | 8/1999 | Carter, Jr. .................... | 244/104 |
| 5,956,951 A | * | 9/1999 | O'Callaghen ............. | 188/267.1 |
| 5,997,250 A | | 12/1999 | Carter, Jr. et al. ............ | 416/27 |
| 6,077,041 A | | 1/2000 | Carter, Jr. .................... | 416/169 |
| 6,024,325 A | | 2/2000 | Carter, Jr. ................. | 244/17.25 |
| 6,095,486 A | * | 8/2000 | Ivers et al. .................. | 137/909 |
| 6,155,784 A | | 12/2000 | Carter, Jr. .................... | 416/134 |

FOREIGN PATENT DOCUMENTS

| | | |
|---|---|---|
| EP | 0335016 | 4/1989 |
| GB | 2111171 A | 6/1983 |
| WO | WO98/00653 | 1/1998 |
| WO | WO98.00704 | 1/1998 |
| WO | WO98/39578 | 9/1998 |

\* cited by examiner

*Primary Examiner*—Peter M. Poon
*Assistant Examiner*—Timothy D. Collins
(74) *Attorney, Agent, or Firm*—Bracewell & Patterson, L.L.P.

(57) ABSTRACT

An aircraft landing gear includes a sealed cylinder divided by a cylinder head to define an upper chamber and a lower chamber. The lower chamber is further divided by a piston having a piston rod passing in a sealed manner through the lower cylinder end. The cylinder head includes one or more orifices, the opening of each containing an electromagnetic coil configured to control the viscosity of the magneto-rheological oil passing therethrough. The electrical current through the electromagnetic coil is continually controlled by a microcomputer with attached sensors for piston position and pressure between the desired piston and the cylinder head, such that the pressure between the piston and the cylinder head decelerates the aircraft evenly throughout the desired piston stroke. The pressure also is limited to a desired maximum level so that, in a severe crash, the shock absorber will absorb significant energy before it fails structurally.

11 Claims, 9 Drawing Sheets

LANDING GEAR SHOCK ABSORBER WITH VARIABLE VISCOSITY FLUID

This application claims the priority date of provisional application Ser. No. 60/206,669, filed May 24, 2000.

BACKGROUND OF THE INVENTION

1. Technical Field

The present invention generally relates to an improved landing gear retraction and shock absorption system having an air over oil shock absorber wherein the oil is magneto-rheological.

2. Description of the Prior Art

Various combinations of springs and shock absorbers are known to absorb the landing energy of aircraft and provide suspension. Electric, hydraulic, or pneumatic systems have been used to extend and retract landing gear, in some cases using the shock absorbing cylinder as an actuator. Most prior art shock absorbing systems have the characteristic that high forces associated with hard or crash landings will structurally fail the shock absorbers before much energy is absorbed. As a result, the aircraft structure itself and the passengers absorb the crash forces. Other prior art designs absorb crash forces by permanently deforming a portion of the shock absorbing device.

U.S. Pat. No. 5,944,283 describes a system that utilizes the difference between the internal pressure of a shock absorber and atmospheric pressure to control flow between two internal chambers. By providing such pressure limiting means in the shock absorber, it is possible to absorb the design maximum amount of energy before structural failure, without damaging the shock absorber or the airframe.

SUMMARY OF THE INVENTION

One embodiment of an aircraft landing gear constructed in accordance with the present invention utilizes a sealed cylinder that is divided by a cylinder head to define an upper chamber and a lower chamber. The lower chamber is further divided by a piston having a piston rod passing through a sealed lower cylinder end. The cylinder head includes one or more orifices, the opening of each containing an electromagnetic coil that is configured to control the viscosity of the magneto-rheological fluid passing therethrough. The electrical current through the electromagnetic coil is continually controlled by a microcomputer with attached sensors for sensing the position of the piston and the pressure between the piston and the cylinder head. It is the pressure between the piston and the cylinder head that decelerates the aircraft evenly throughout the desired piston stroke. The pressure also is limited to a desired maximum level so that, in a severe crash, the shock absorber will absorb significant energy before it fails structurally.

Accordingly, it is an object of the present invention to provide a combined air suspension and shock absorber capable of smoothly decelerating the landing of an aircraft throughout a large range of vertical velocities.

Another object is to have pressure peak limiting means that operates during hard or crash landings, such that maximum impact energy is absorbed before the shock absorber bottoms or fails.

Yet another object of the present invention is for the air suspension to be dynamically optimized for the current weight of the aircraft.

A further object of the present invention is for the suspension and the shock absorber also to be operable as an actuator for a retractable landing gear.

Another object of the present invention is to provide a retractable landing gear actuator that can be powered with low pressure air or other gas.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 2b is a top view of the landing gear cylinder of FIG. 1 taken along the line 2b—2b of FIG. 2a.

FIG. 2c is a bottom view of the landing gear cylinder of FIG. 1 taken along the line 2c—2c of FIG. 2a.

FIG. 2d is a sectional end view of the cylinder head of the landing gear of FIG. 1 taken along the line 2d—2d of FIG. 2a.

DETAILED DESCRIPTION OF THE PREFERRED EMBODIMENT OF THE PRESENT INVENTION

Figure 1A:
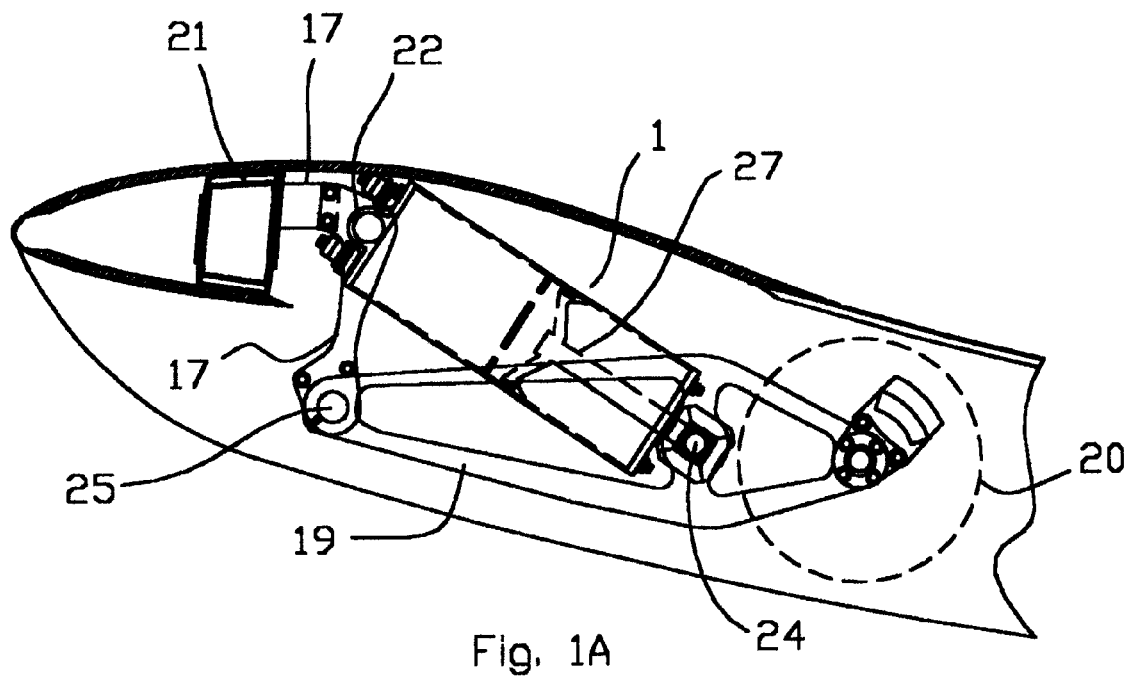
FIG. 1a is a side view of a landing gear and landing gear cylinder constructed in accordance with the present invention, and is shown in a retracted position.
Figure 1B:
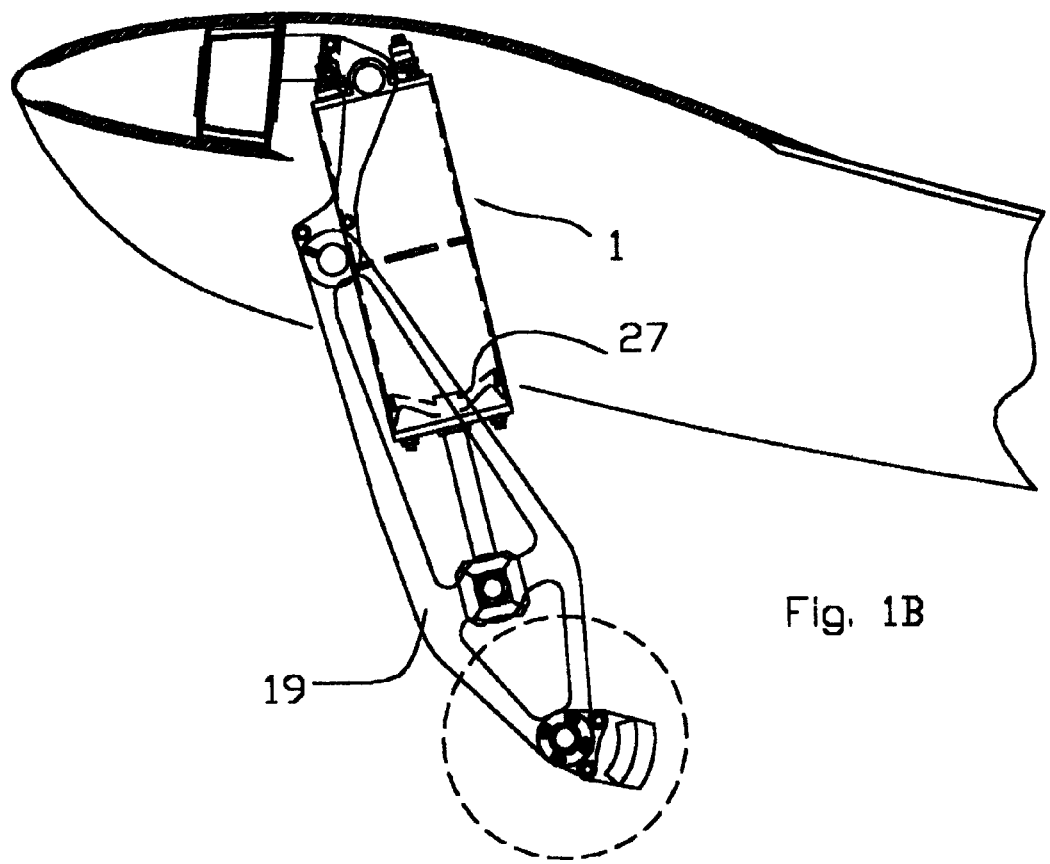
FIG. 1b is a side view of the landing gear and landing gear cylinder of FIG. 1 and is shown in an extended position.

FIG. 1a shows a side view cross section of a cylinder assembly 1 with the landing gear retracted. In the embodiment shown, landing gear leg 19 with wheel 20 is pivotably attached by bearing 25 to wing spar 21. Cylinder assembly 1 is pivotally attached to wing spar 21 by bushing 22 and to landing gear leg 19 by bushing 24. FIG. 1b shows a side view cross section of the cylinder assembly 1 with the landing gear extended. Contrasting FIGS. 1a and 1b, respectively, piston 27 is fully inserted within cylinder assembly 1 with landing gear leg 19 in the retracted position, and fully withdrawn from cylinder assembly 1 with landing gear leg 19 in the extended position.

Figure 2A:
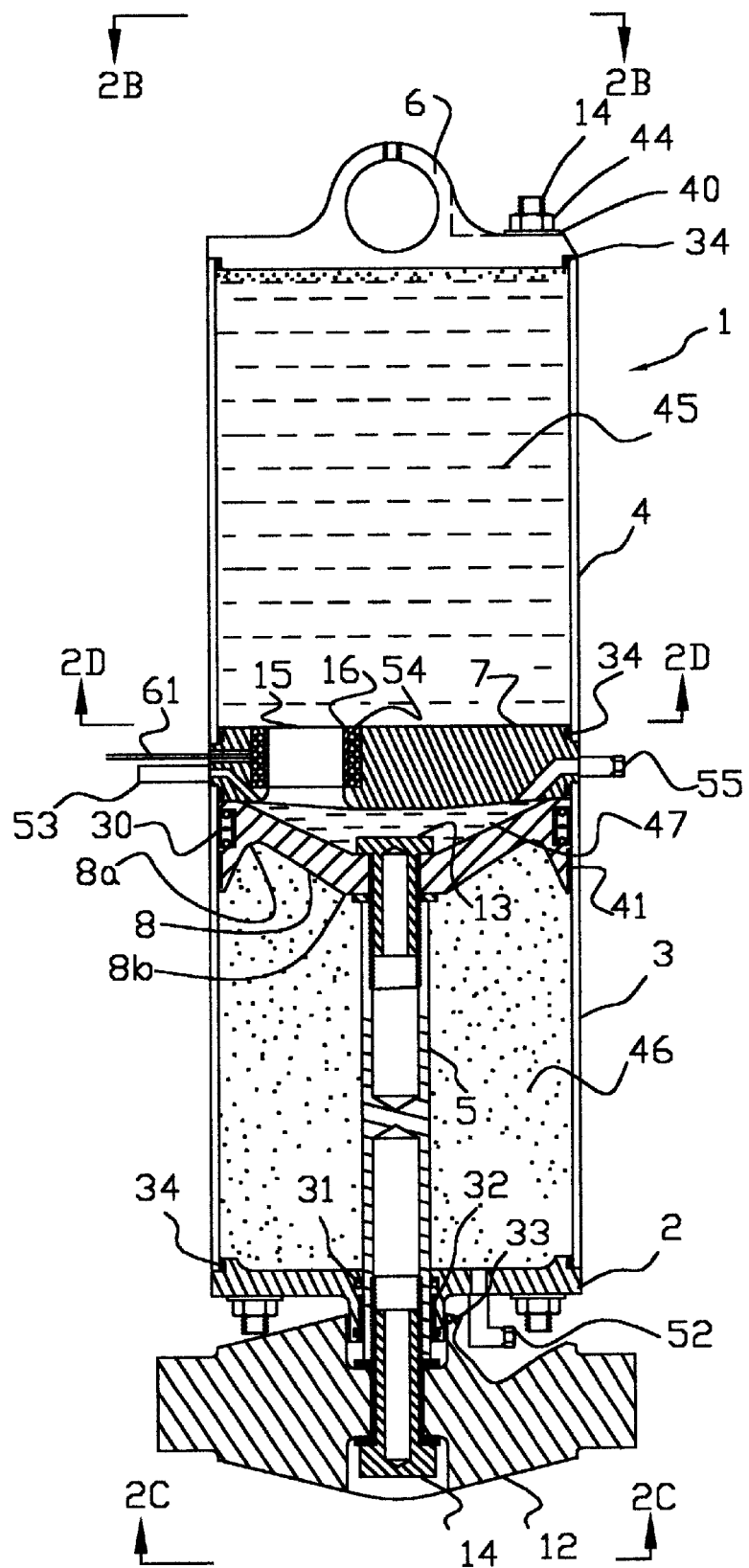
FIG. 2a is an enlarged sectional side view of the landing gear cylinder of FIG. 1 in the retracted position.

Referring to FIG. 2a, cylinder assembly 1 comprises a lower cylinder 3 and an upper cylinder 4 that are separated and sealed by cylinder head 7. Top cap 6 seals the top of upper cylinder 4 and provides an attachment for a shaft (not shown) on which the cylinder assembly 1 pivots and attaches to the airframe. Bottom cap 2 seals the bottom of lower cylinder 3. Piston 8 is attached to piston rod 5 by bolt 13. Piston rod 5 passes through bottom cap 2, sliding on a Teflon® bushing 32 and sealed by piston seal 31 and wiper seal 33. Trunion 12 pivotably attaches piston rod 5 to the aircraft landing gear leg (not shown). Piston 8 slides in lower cylinder 3 on a Teflon® ring 41 and is sealed by a piston seal 30. Piston rod 5 is hollow to reduce weight.

In the retracted position, volume 45 is full of hydraulic fluid or oil except for a small volume of gas at atmospheric pressure. Volume 47 is full of oil and volume 46 is full of pressurized gas. In the preferred embodiment, the oil is a magneto-rheological fluid, which changes viscosity in response to a magnetic field. Cylinder assembly 1 is held together with four cylinder bolts 14, each of which extends through the top cap 6, along the outside of the upper cylinder 4 and lower cylinder 3, and through the bottom cap 2. Washers 40 and nuts 44 on the ends of the cylinder bolts hold cylinder assembly 1 together. All stationary joints are sealed with o-rings 34.

Figure 2B:
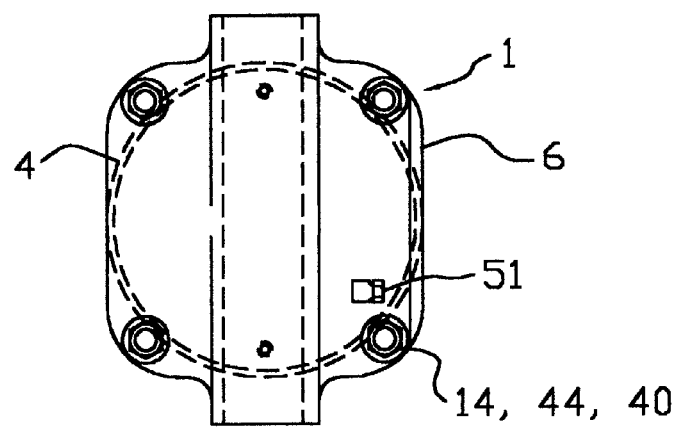

FIG. 2b is a top view of the landing gear cylinder. Top cap 6 seals the top end of upper cylinder 4. Four cylinder bolts 14 pass through top cap 6, and nuts 44 and washers 40 hold top cap 6 onto the landing gear cylinder assembly 1. A top cap gas pressure fitting 51 is sealingly threaded into top cap 6 and is used to apply gas pressure to force the landing gear to the extended position.

Figure 2C:
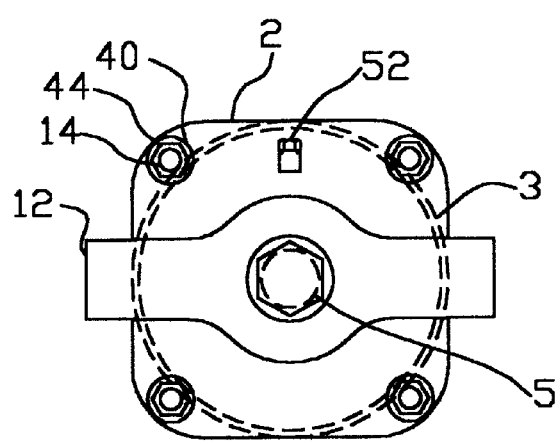
Figure 2D:
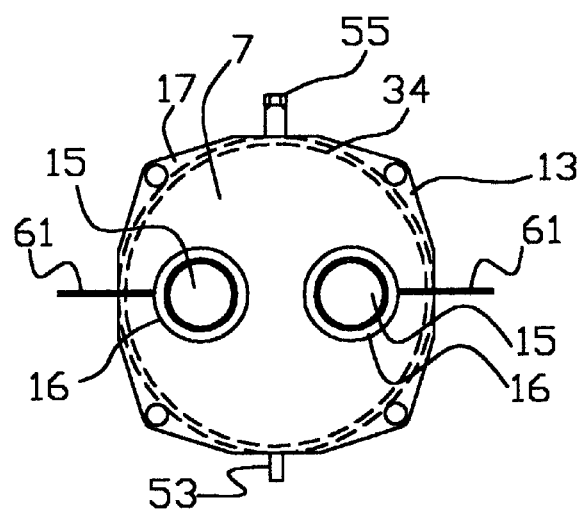

FIG. 2c shows a bottom view of the landing gear cylinder. Bottom cap 2 seals the bottom end of lower cylinder 3. Piston rod 5 passes through the center of bottom cap 2. A bottom cap gas pressure fitting 52 is threaded through the bottom cap 2 and is used to apply gas or oil pressure to force the landing gear to the retracted position. Trunion 12 attaches piston rod 5 to the landing gear leg (not shown). FIG. 2d shows a cross section of the cylinder head 7, showing the orifice inserts 16 which enclose electromagnetic coils 54 (see FIG. 5). Orifice 15 is the opening inside orifice insert 16. The landing gear cylinder also can be used as a shock absorber and suspension without the landing gear retraction and extension feature. In this version, the top cap gas pressure fitting 51 and bottom cap gas pressure fitting 52 are used only to preset the internal pressure on the ground before flight, and then they are sealed.

Figure 3:
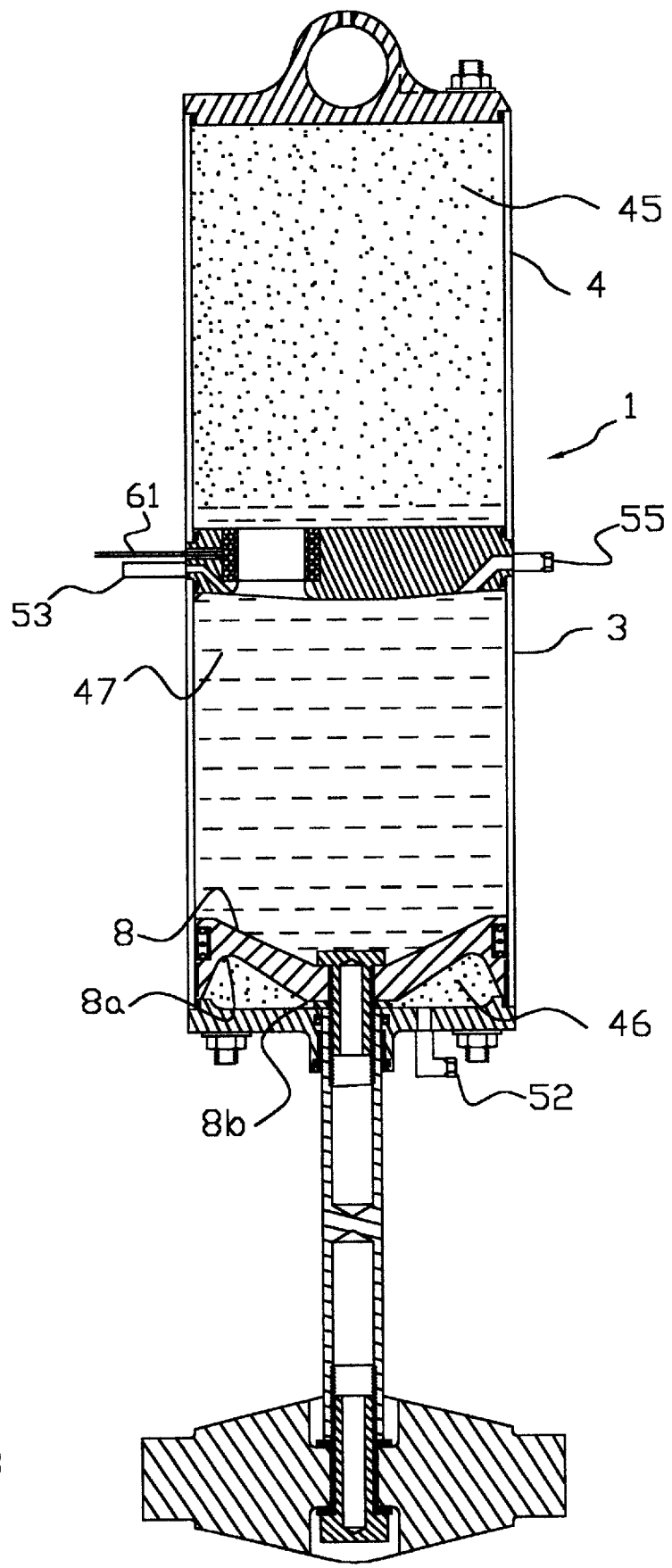
FIG. 3 is a sectional side view of the landing gear cylinder of FIG. 1 in the extended position, such as before landing an aircraft.

FIG. 3 shows a side view detail of the cylinder assembly in the extended position, as it would be in flight just prior to landing. Piston 8 is fully extended, volume 47 is completely filled with the hydraulic fluid, volume 45 is predominately filled with air at a pressure of approximately 110 psi, and volume 46 contains air at atmospheric pressure.

Figure 4:
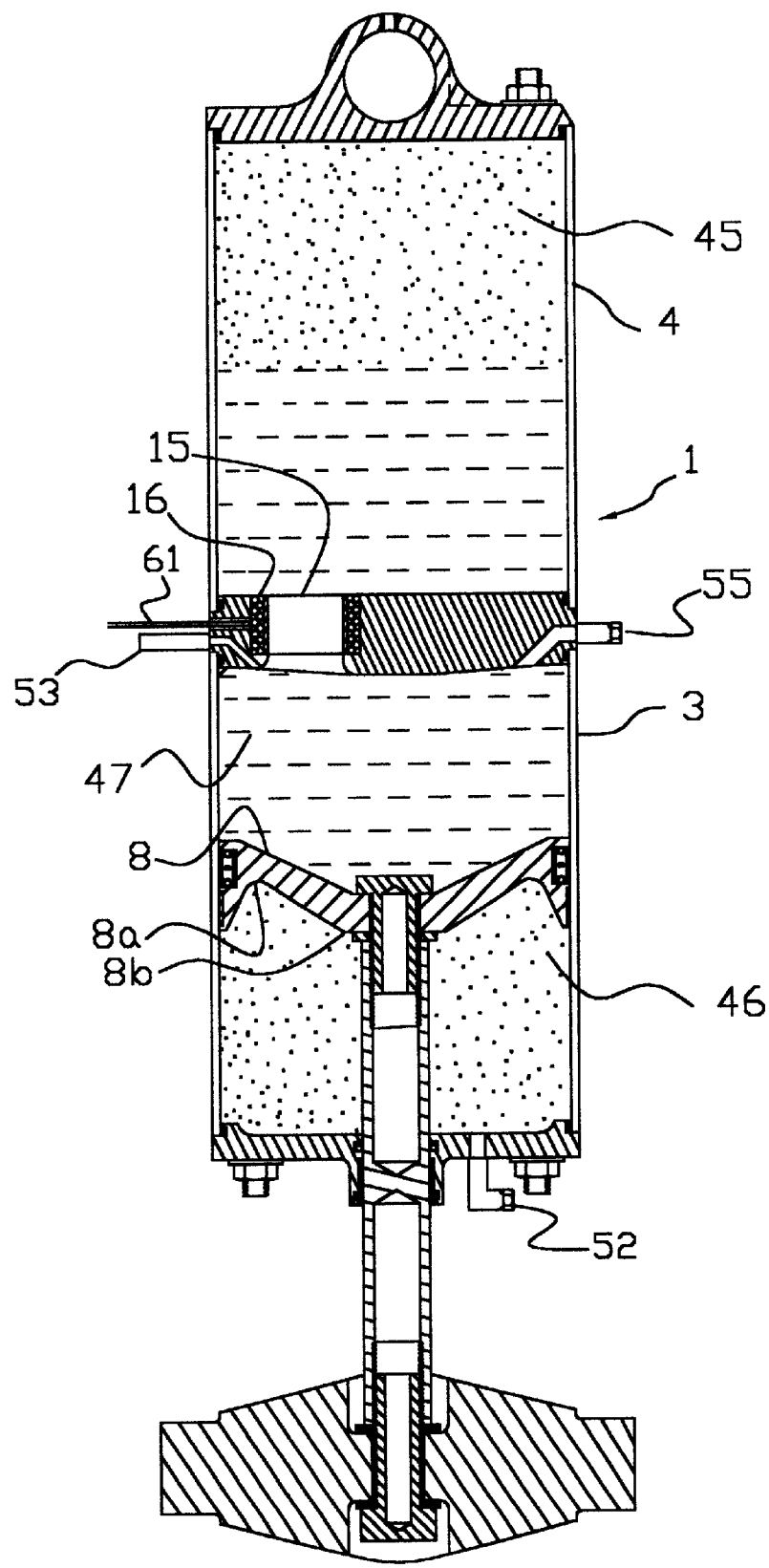
FIG. 4 is a sectional side view of the landing gear cylinder of FIG. 1 in an intermediate position, such as during taxiing of an aircraft.
Figure 5:
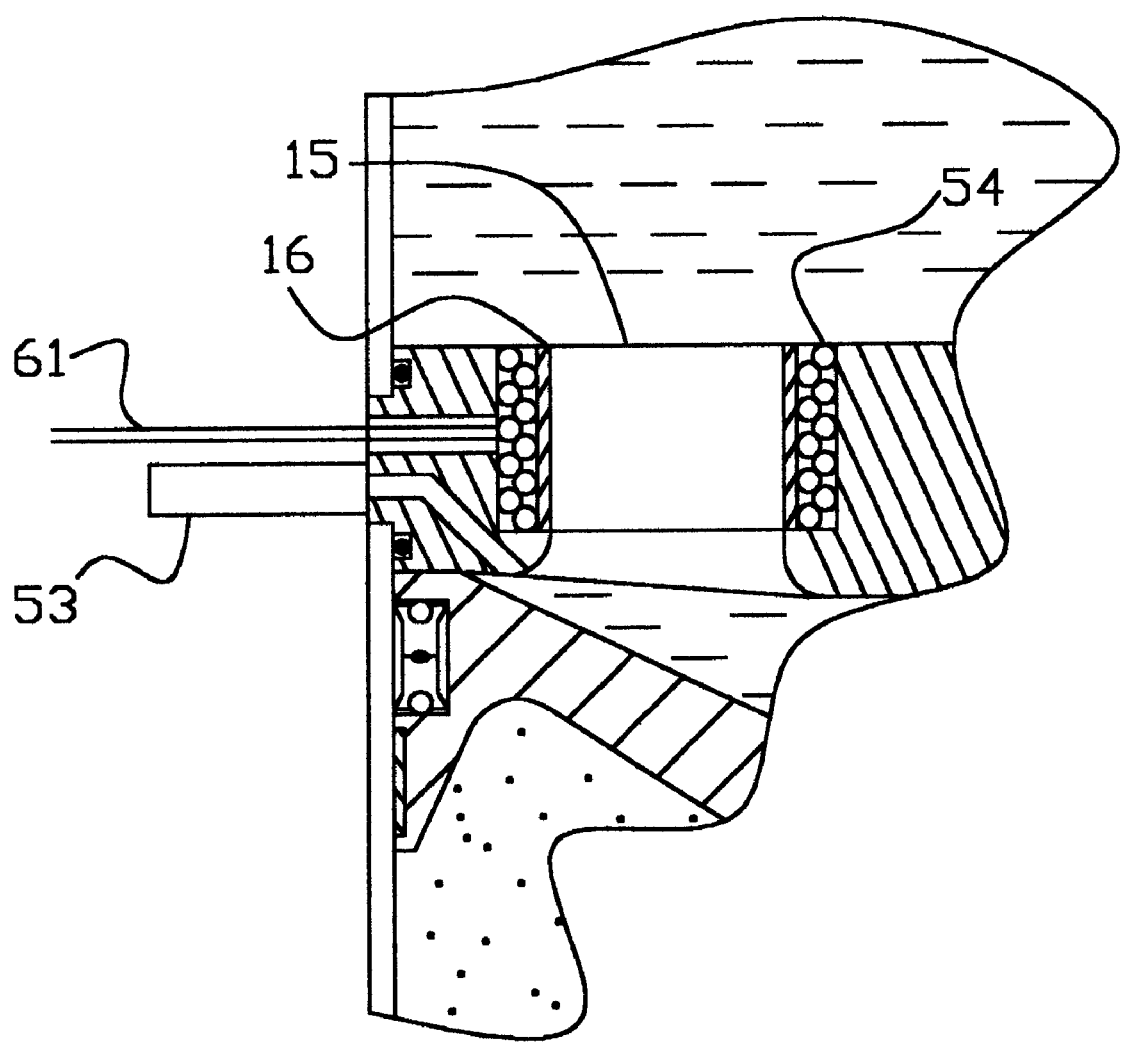
FIG. 5 is an enlarged sectional side view of an electromagnetically controlled orifice in the landing gear of FIG. 1.

FIG. 4 shows the cylinder assembly in an intermediate position, such as would exist during taxiing. When bumps in the runway are encountered, piston 8 moves upward, thereby forcing some hydraulic fluid through orifice 15, such that the orifice acts as a shock absorber. Between bumps, the pressure in volume 45 in excess of the pressure in volume 47 pushes oil back through the orifice and the cylinder is ready to absorb the impact of the next bump in the runway. FIG. 5 is an enlarged view of the orifice, showing the electromagnetic coils 54 of electrical wire 61 which form a magnetic field within orifice 15. The exterior electrical wire extends to a microcomputer (not shown).

Figure 6:
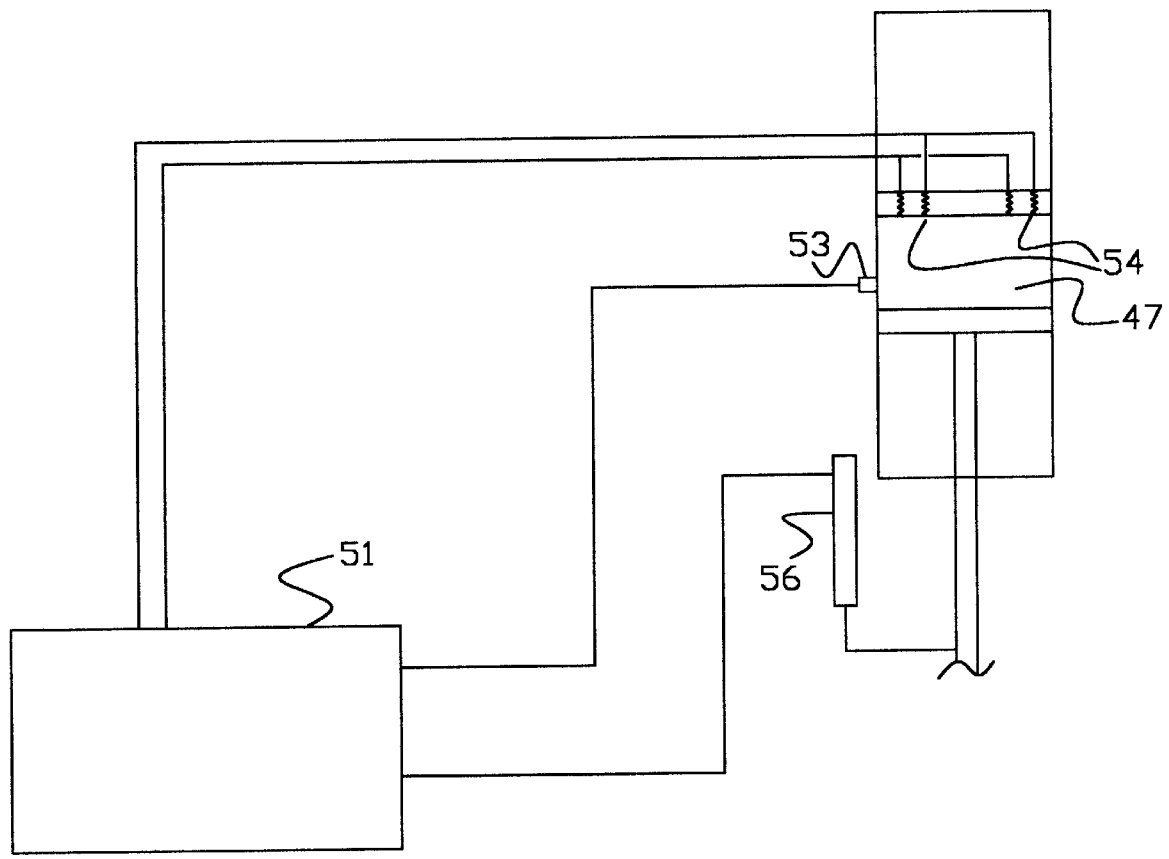
FIG. 6 is a block diagram of an electrical control system for the landing gear of FIG. 1.

FIG. 6 shows a block diagram of one embodiment of a control system for the orifice. In the version shown, a microcomputer 51 takes input from a pressure sensor 53 mounted inside the cylinder between the piston and the cylinder head. A linear potentiometer 56 enables measurement of the position and the velocity of the piston, and feeds the information to microcomputer 51 which controls the current passing through electromagnetic coils 54.

The function of microcomputer 51 is to control the pressure in volume 47 by controlling the viscosity of the fluid passing through the orifices. For aircraft landing, the viscosity is initially relatively low and is increased as soon as the landing gear has compressed enough to determine the velocity of impact. Microcomputer 51 calculates the pressure in volume 47 that will be needed, given the current velocity, to decelerate the aircraft in the amount of piston stroke that is available, and then adjusts the viscosity to achieve that pressure. If the viscosity were allowed to remain too low, the initial pressure would be low but the deceleration would also be low so the cylinder would bottom out and structurally fail before the desired amount of deceleration has occurred. The viscosity is never allowed to get too high because this would create a pressure so high as to immediately fail the cylinder.

Preferably, for an impact at a vertical velocity of approximately 50 feet per second, the pressure should be set to achieve the yield stress level in the cylinder material (the stress level that would cause permanent deformation without immediate failure), and the deceleration would be approximately 7.5 Gs and use the entire stroke. After such a landing, repairs would be necessary. For a less severe impact at 39 feet per second, for example, the initial pressure should achieve a stress just below the material fatigue limit, and should decelerate the aircraft throughout the entire stroke at about 5 Gs. For even softer impacts, progressively less of the stroke would be used, since it is desirable to have part of the stroke in reserve to handle bumps on the runway during the rollout. For all impacts occurring at a rate of 39 feet per second or less, there would be no damage and no repairs necessary.

During taxiing of the aircraft, piston 8 rises until the pressure in volume 45 reaches the level needed to support the aircraft. Pressure in volume 45 works like a spring, and the oil flowing back and forth through orifice 15 acts to damp oscillations, the combination of which provides a soft suspension during taxiing. The initial pressure in volume 45 is set such that piston 8 moves to approximately the middle of its range of motion before the pressure in volume 45 will support the aircraft when the aircraft is moderately loaded and stationary. On the ground, the viscosity is adjusted to obtain the appropriate degree of damping for routine shocks and taxiing. If it is too high, the ride is harsh, while if it is too low, the ride is bouncy. The viscosity can be adjusted approximately 100 times per second, so it is possible to dynamically adjust the ride for the roughness of the terrain.

Upon landing the aircraft, oil in volume 47 is forced through orifice 15. At low piston velocity, such as during gentle landings, oil passes through orifice 15 until the pressure in volume 45 is sufficient to support the weight applied to the landing gear wheel supported by this cylinder. At higher piston velocities the aircraft continues to decelerate until its vertical velocity has been halted. At this point, the compressed air in upper chamber 45 will be in excess of the pressure needed to support the weight on this wheel, so the aircraft is gently forced back upwards, although much more slowly than the initial descent. The down-up oscillation is somewhat damped by the oil flowing through the orifice, but it can be damped even more quickly by increasing the viscosity during the rebound. However, a rebound that is too slow would result in the shock being compressed too far when other bumps are encountered.

The total orifice area is a compromise between crash shock absorption when the controller is functioning properly, and landings performance when the controller is not operating (such as during an electrical failure). During a crash, the total area of the orifices determines the maximum velocity the cylinder assembly could experience before immediate failure would occur, because that total area governs the pressure above the piston. For optimum performance with the controller operating properly, the orifice size would be such that it provides the proper restriction at the minimum fluid viscosity to decelerate a crash landing at the maximum design descent rate. However, if the orifices are this big and the controller is not operating, the orifices will provide very little restriction to flow of the thin fluid, and the landing gear will not absorb much energy. Therefore, depending on the design priorities, the total orifice area maybe reduced to achieve better performance in case the controller or electrical system fails, or the electrical system has double redundancy in the components and has an isolated power source as in a battery.

In the retracted position, air pressure on port 52 holds the cylinder in the up position and exerts the retracting force. To extend the gear, port 52 is vented to the atmosphere, and residual pressure in upper chamber 45 is sufficient to extend the gear at low airspeeds in case of failure of the air compressor. Cylinders 3 and 4 are of relatively large diameter so that low pressure air or other gas can be used to retract or extend the landing gear.

Figure 7A:
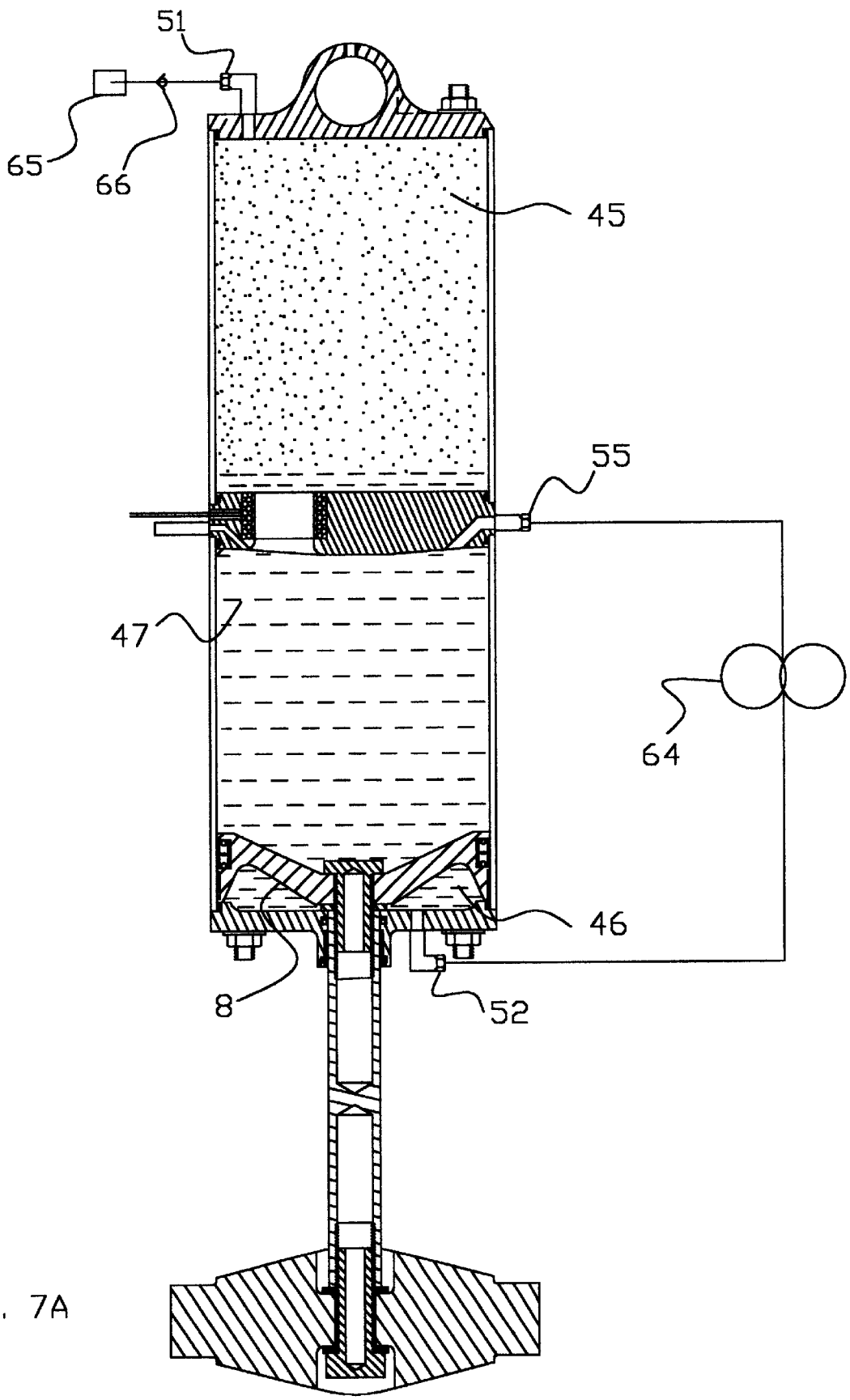
FIG. 7a is a sectional side view of an alternate embodiment of a landing gear cylinder constructed in accordance with the present invention, shown in the extended position, and is configured for actuation using oil instead of air.
Figure 7B:
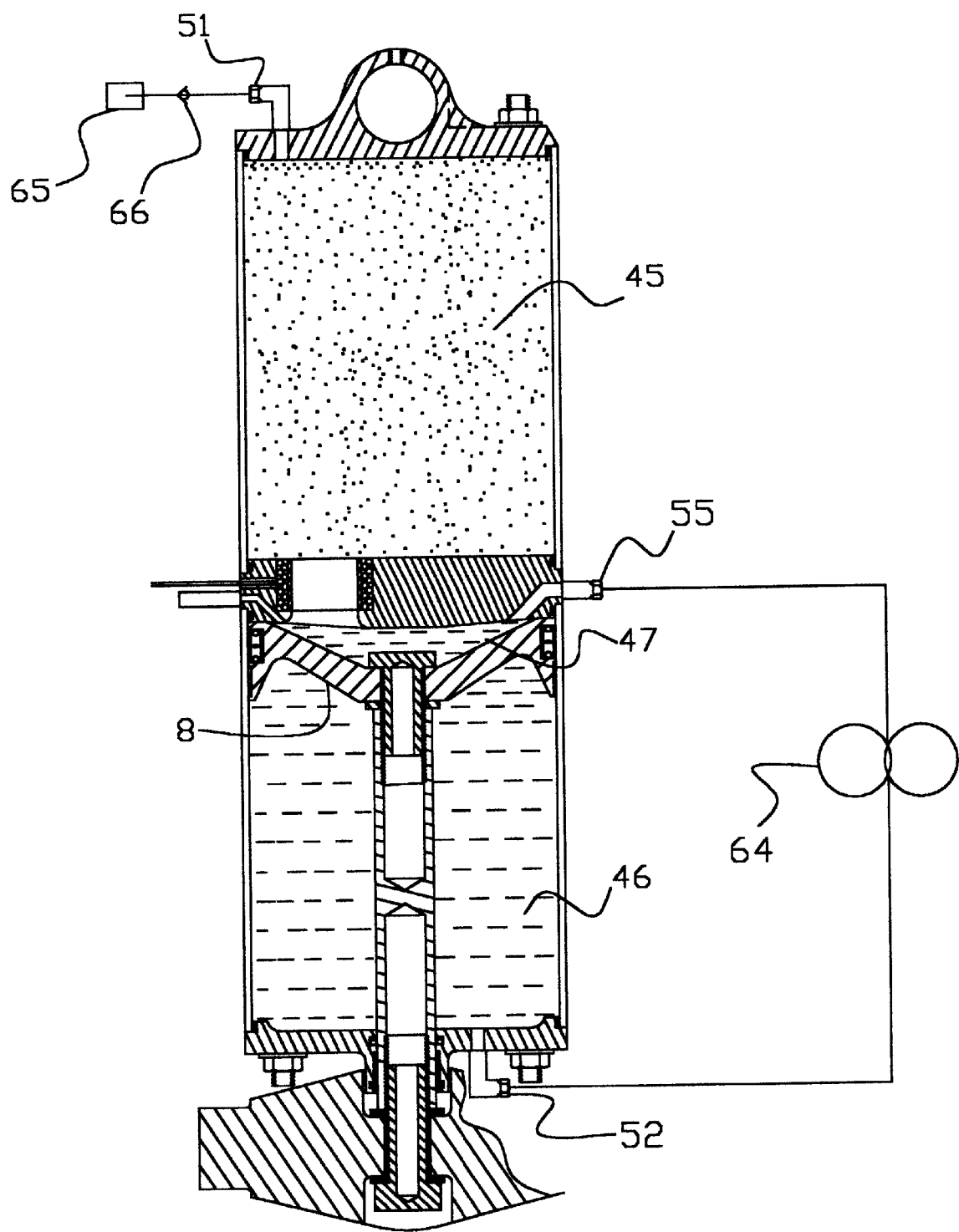
FIG. 7b is a sectional side view of the landing gear cylinder of FIG. 7a and is shown in the retracted position.

Another method of actuation is to use oil instead of air. Referring to FIG. 7*a*, to retract the landing gear, oil is pumped directly from the top of volume 47 into volume 46 using an oil transfer pump 64. As shown in FIG. 7*b*, to extend the landing gear, oil is pumped from volume 46 into volume 47 by reversing pump 64. Volumes 45 and 46 could be sealed instead of vented to the atmosphere during gear extension and retraction. Because oil is incompressible, it takes less energy to actuate the landing gear using oil than it would with air. An air pump 65 would still be needed to precharge volume 45 through port 51 with pressurized air prior to landing, but only to make up for any leakage out of the system. Check valve 66 allows precharging with pressurized air while reducing leakage from volume 45 and isolating the air supply from the high pressures that occur in volume 45 upon landing.

The present invention has several advantages. The magneto-rheological fluid used by the landing gear system changes to an appropriate viscosity in response to a controlled magnetic field in order to readily adapt the landing gear to various conditions, including hard or crash landings, and taxiing. The cylinder head has orifice inserts that enclose electromagnetic coils for changing the viscous properties of the oil. The viscosity can be adjusted approximately 100 times a second, so it is possible to dynamically tune the suspension to accommodate for the terrain. For example, when an aircraft is landing, the viscosity begins low and is increased when the landing gear has compressed enough to determine the velocity of impact. The pressure desired is calculated based on the current velocity to decelerate the aircraft in the available stroke, and the viscosity is adjusted to achieve that pressure. In addition, the landing gear cylinder can be used as a shock absorber and suspension without the landing gear retraction and extension feature.

While the invention has been shown or described in only some of its forms, it should be apparent to those skilled in the art that it is not so limited, but is susceptible to various changes without departing from the scope of the invention.

What is claimed is:

1. A suspension and shock absorber for a retractable landing gear of an aircraft, comprising:

a cylinder having a first end and a second end;

a piston located in the cylinder, the piston having a rod extending outward from the second end of the cylinder, the piston dividing the cylinder into first and second chambers that change in volume as the piston moves within the cylinder;

a magneto-rheological hydraulic fluid located within the first chamber of the cylinder and in contact with a first side of the piston;

a pressurized gas mixed with the hydraulic fluid within the first chamber;

a pressurized gas in the second chamber in contact with a second side of the piston;

an orifice in the first chamber of the cylinder, through which the hydraulic fluid flows as the piston moves relative to the cylinder;

an electromagnetic coil mounted to the orifice for generating an electromagnetic field in the orifice to alter a viscosity of the hydraulic fluid flowing through the orifice due to movement of the piston toward the first end of the piston toward the first end of the cylinder; and a controller for dynamically controlling the electromagnetic coil with respect to a deceleration pressure of the cylinder and a position and velocity of the piston and if the velocity is sufficiently high, for setting the deceleration pressure to hold the stress of the material of the cylinder during deceleration of the piston at a level that would cause permanent deformation without immediate failure.

2. The suspension and shock absorber of claim 1 wherein the orifice is stationarily mounted in the cylinder.

3. The suspension and shock absorber of claim 1, further comprising a pressure sensor mounted between the cylinder and the piston for measuring pressure therebetween, and a linear potentiometer for measuring the position and velocity of the piston.

4. A method of absorbing shock for a landing gear of an aircraft, the method comprising the steps of:

(a) providing a cylinder, a piston in the cylinder, a variable viscosity magneto-rheological hydraulic fluid between the cylinder and the piston, and an orifice through which the hydraulic fluid moves;

(b) applying shock to the piston;

(c) measuring the initial velocity of the piston due to the shock; then (d) computing a deceleration pressure of the fluid within the cylinder for decelerating the piston uniformly; then (e) continuously altering a viscosity of the hydraulic fluid by generating and varying a magnetic field in the orifice as the piston decelerates to maintain the deceleration pressure constant; and (f) wherein if the initial velocity of the piston measured in step (c) is sufficiently high, in step (d) the deceleration pressure is computed to hold the stress of the material of the cylinder during deceleration of the piston at a level that would cause permanent deformation without immediate failure.

5. The method of claim 4, further comprising continuously sensing the deceleration pressure and varying the magnetic field in response to the deceleration pressure sensed.

6. The method of claim 4, wherein step (d) further comprises computing a stroke length for the piston based upon the initial velocity of the piston.

7. The method of claim 6, wherein the stroke length computed is greater for higher initial velocities than lower initial velocities of the piston.

8. The method of claim 4, wherein step (a) further comprises applying gas pressure in the cylinder on a side of the piston opposite the hydraulic fluid.

9. The method of claim 4, wherein step (a) further comprises retracting the landing gear while in flight by applying gas pressure to a side of the piston opposite the hydraulic fluid, and extending the landing gear for landing by reducing the gas pressure.

10. The method of claim 4, wherein step (a) further comprises retracting the landing gear while in flight by pumping hydraulic fluid from a first side of the piston to second side of the piston, and extending the landing gear for landing by pumping hydraulic fluid from the second side of the piston to the first side of the piston.

11. A suspension and shock absorber for a retractable landing gear of an aircraft, comprising:

a cylinder having a first end and a second end;

a piston located in the cylinder, the piston having a rod extending outward from the second end of the cylinder, the piston dividing the cylinder into first and second chambers;

a magneto-rheological hydraulic fluid located within the first chamber of the cylinder and in contact with a first side of the piston;

a pressurized gas mixed with the hydraulic fluid in the first chamber;

a pressurized gas in the second chamber in contact with a second side of the piston;

an orifice stationarily mounted in the first chamber of the cylinder, through which the hydraulic fluid flows as the piston moves relative to the cylinder;

an electromagnetic coil mounted to the orifice for generating an electromagnetic field in the orifice to vary viscosity of the hydraulic fluid flowing through the orifice;

means for measuring a velocity of the piston upon receiving an impact;

means including a microcomputer for computing a deceleration pressure of the fluid within the cylinder to decelerate the piston uniformly based upon the velocity measured, and for varying power supplied to the coil as the piston decelerates to maintain the deceleration pressure constant, and if an initial velocity of the piston is sufficiently high, for setting the deceleration pressure to hold the stress of the material of the cylinder during deceleration of the piston at a level that would cause permanent deformation without immediate failure; and a pressure sensor in the first chamber for continuously monitoring the deceleration pressure within the first chamber and providing a signal to the microcomputer so as to maintain the deceleration pressure constant as the piston decelerates.

* * * * *